US006842356B2

(12) United States Patent
Hsu

(10) Patent No.: US 6,842,356 B2
(45) Date of Patent: Jan. 11, 2005

(54) FIREWIRE/USB BUS-CHARGER FOR 12V DC AUTOMOTIVE

(76) Inventor: Benjamin Hsu, 1628 Turnpost La., Hacienda Height, CA (US) 91745

( * ) Notice: Subject to any disclaimer, the term of this patent is extended or adjusted under 35 U.S.C. 154(b) by 35 days.

(21) Appl. No.: 10/600,855

(22) Filed: Jun. 19, 2003

(65) Prior Publication Data
US 2004/0008012 A1 Jan. 15, 2004

Related U.S. Application Data
(60) Provisional application No. 60/390,766, filed on Jun. 21, 2002.

(51) Int. Cl.[7] .............................. H02M 1/00; B60L 1/00
(52) U.S. Cl. ...................................... 363/146; 307/10.1
(58) Field of Search ............................... 363/144, 146; 307/9.1, 10.1; 439/34, 503, 884, 891

(56) References Cited

U.S. PATENT DOCUMENTS

| 5,442,332 A | * | 8/1995 | Hughes | 340/467 |
| 5,714,805 A | * | 2/1998 | Lobaugh | 307/10.1 |
| 6,007,372 A | * | 12/1999 | Wood | 439/502 |
| 6,052,603 A | * | 4/2000 | Kinzalow et al. | 455/557 |

* cited by examiner

Primary Examiner—Matthew V. Nguyen

(57) ABSTRACT

An on-vehicle charger is provided to connect with a cigarette-lighting receptacle for supplying a DC power from an automotive to a circuit board. The input power is shunted, converted, regulated, and outputted to a USB jack and a FireWire jack respectively to serve as a FireWire power source for iPod.

5 Claims, 3 Drawing Sheets

FIREWIRE/USB BUS-CHARGER FOR 12V DC AUTOMOTIVE

This appln claims benefit 60/390,766 Jun. 21, 2002.

BACKGROUND OF THE INVENTION

1. Field of the Invention

The present invention relates generally to an electrical charger, and more particularly, it concerns an automotive charger capable of providing a charging power via a safe input channel and respective power levels to both a USB (Universal Serial Bus) interface and a FireWire (also known as IEEE 1394) interface of an electronic device, such as a personal digital assistant, for example iPod, through a tube fuse arrangement.

2. The Priro Arts

Today's radio cassette player does present a new appearance under the trend of digitalization when it is put together with a personal digital assistant (PDA) to form the known Palm and Hand Held PC, where the USB interface is applied.

The iPod of Apple Computer is more than just a PDA or a radio cassette player. It is a combination thereof for providing music and storing data in an address book, a calendar, etc. Moreover, the iPod also provides built-in games for killing time and "notes reader" function for reading notebook to enable a user to download and read written data. Therefore, a user may store almost everything in the iPod in advance, such as preferred essays, evaluation of restaurants, city map, train's timetable, itinerary map of city bus, nightlife guide, news essays, or procedure for bodybuilding.

However, the iPod, which may be considered one of the best trip-mates, is weakened at the limited capacity of its built-in battery during a long-distance travel. Hence it could be a feasible idea to overcome this imperfection by introducing a proper power source from the vehicle's DC power through a charge coupling of the on-vehicle cigarette lighter.

As it is understood that the power input terminal of the iPod is a FireWire port, which is a port for power input and data transmission conforming with the so-far fastest communication standards according to IEEE, expectable for application in camera of Multi-media equipments or in new-era hard disks and printers. The transmission speed of the FireWire port could be as high as 400 megabits/sec, which is four times of the 100Base-T Ethernet or forty times of the 10Base-T Ethernet.

In addition to high speed and flexible connecting ability for serial connection with as many as 63 equipments, the FireWire interface is advantageous in: (1) No need to shut down the power and reboot during a hot-swapping; and (2) Independent of equipment number, jump, DIP switch, screw, or latch because of the FireWire interface's Plug and Play (PnP) feature. Up to this moment, the standards of FireWire peripheral interface have been readily applied in Digital Video CamCorder, Hard Disk Drive (HDD), and iPod of Apple Computer.

When considering the popularity of the serial products of Apple Computer and Intel/Microsoft inside computer, an automotive common charger through the on-vehicle cigarette lighter for charging and providing power to FireWire/USB interface is obviously valuable.

SUMMARY OF THE INVENTION

Based on foregoing consideration, the present invention discloses an automotive charger capable of providing power to USB interface and FireWire interface of electronic devices, such as PDA, cellular phone, USB fan, USB lamp/light, USB digital camera/recorder, USB hard drive that have USB connection, and iPod, MP3 player, FireWire hard drive and FireWire storage that have WireFire connection, through an on-vehicle cigarette-lighting receptacle.

Therefore, the primary object of the present invention is to provide a FireWire/USB bus-charger on vehicle for outputting power to FireWire/USB bus in a safe and convenient way through a tube fuse capable of averting over-current phenomenon.

Another object of the present invention is to provide a FireWire/USB bus-charger for charging consuming products, such as an iPod, on vehicle directly.

Yet, another object of the present invention is to provide a FireWire/USB bus charger for charging USB interfaced products, for example, a cellular phone, a PDA, or a lamp, through a USB jack.

For more detailed information regarding advantages or features of the present invention, a preferred embodiment will be described below with reference to the annexed drawings.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

Figure 1:
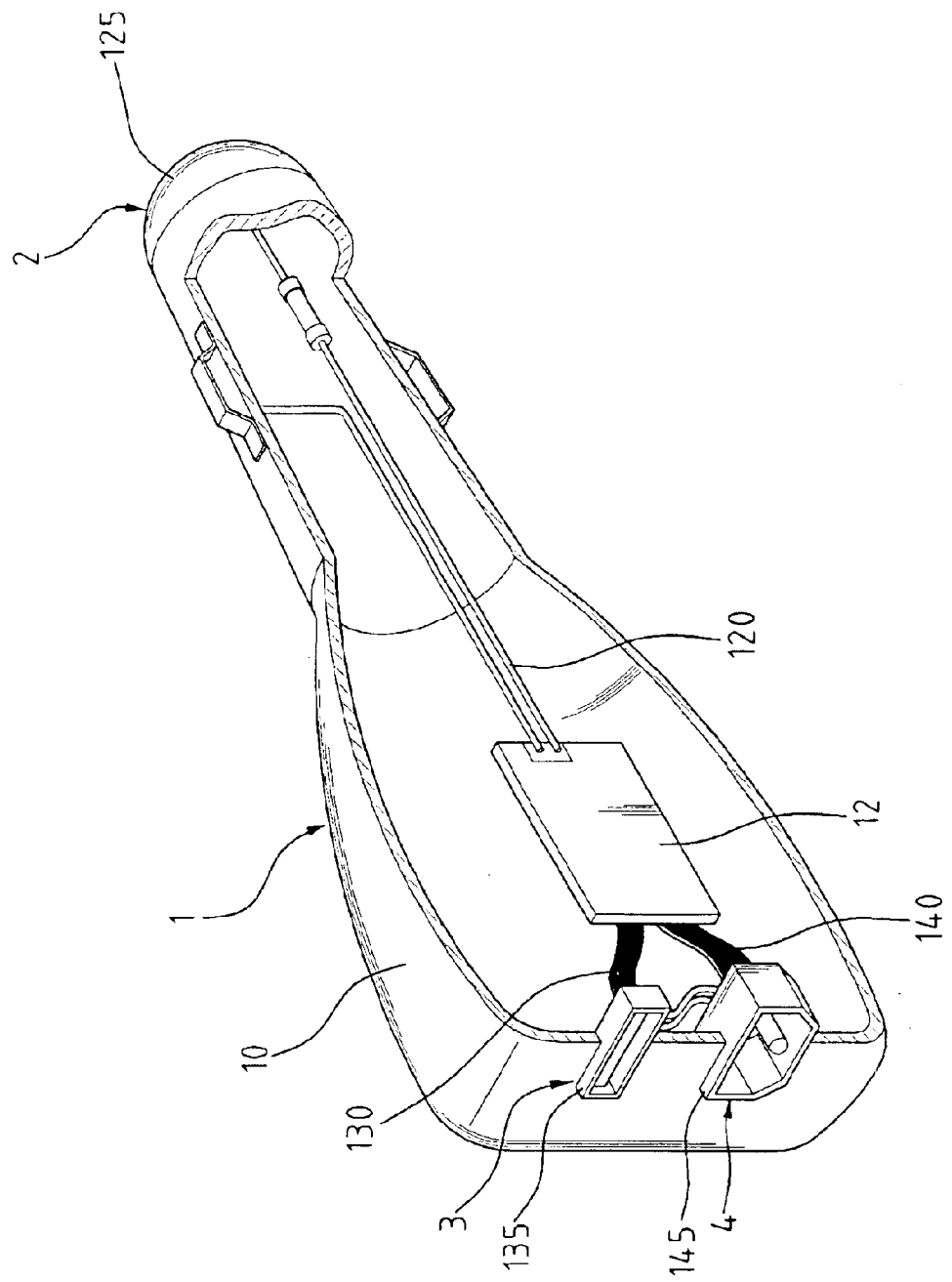
FIG. 1 shows the appearance and a cutaway section of a FireWire/USB based charger of the present invention.

FIG. 1 shows the appearance and a cutaway section of a FireWire/USB based charger of the present invention. The charger of the present invention which is applicable to a FireWire bus or a USB bus comprises a plug seat 1 having a casing 10, in which at least three receptacles 2, 3, and 4 are defined for sleeve-disposition of a cigarette-lighting plug 125, a USB jack 135, and a FireWire jack 145, respectively.

Inside the plug seat 1, a circuit board 12 having a voltage-regulating circuit is fixed inside to the casing 10 by way of plug-disposition or slide-disposition or screw-disposition. In the embodiment illustrated, the screw-disposition manner is adopted. The rest includes a pair of cigarette-lighting receptacle connecting wires 120, the cigarette-lighting plug 125, a USB bus cable 130, the USB jack 135, a FireWire bus cable 140, and the FireWire jack 145.

The protruding plug 125 at one end of the paired connecting wires 120 is provided for being plugged into a cigarette-lighting receptacle (not shown), while the other end of the paired wires is connected to the circuit board 12 for converting an input current into an output current. The paired connecting wires 120 may be connected in series with a tube fuse (not labeled but can be easily identified in the drawings) in order to prevent any over-current phenomenon.

The USB jack 135 is secured at one end of the USB bus cable 130 for coupling with an electronic device having a USB connection (not shown), such as a PDA, a cellular phone, a USB lamp, a USB fan, a USB digital camera/recorder and a USB hard drive, while the other end of the USB bus cable 130 is connected to the circuit board 12 for outputting an input USB power that powers the electronic device.

One end of the FireWire bus cable 140 is the FireWire jack 145, which could be coupled with an electronic device having a FireWire connection (not shown), such as an iPod, an MP3 player, a FireWire har drive, a FireWire storage, while the other end of the FireWire bus cable 140 is connected to the circuit board 12 for supplying power to the electronic device.

As mentioned before, the casing 10 has at least three receptacles 2, 3, and 4 for sequentially sleeve-jointing with the protruding plug 125, the USB jack 135, and the FireWire jack 145, respectively, and by fixing the circuit board 12 to the casing 10, the bus-charger of the present invention can be constructed easily.

Figure 2:
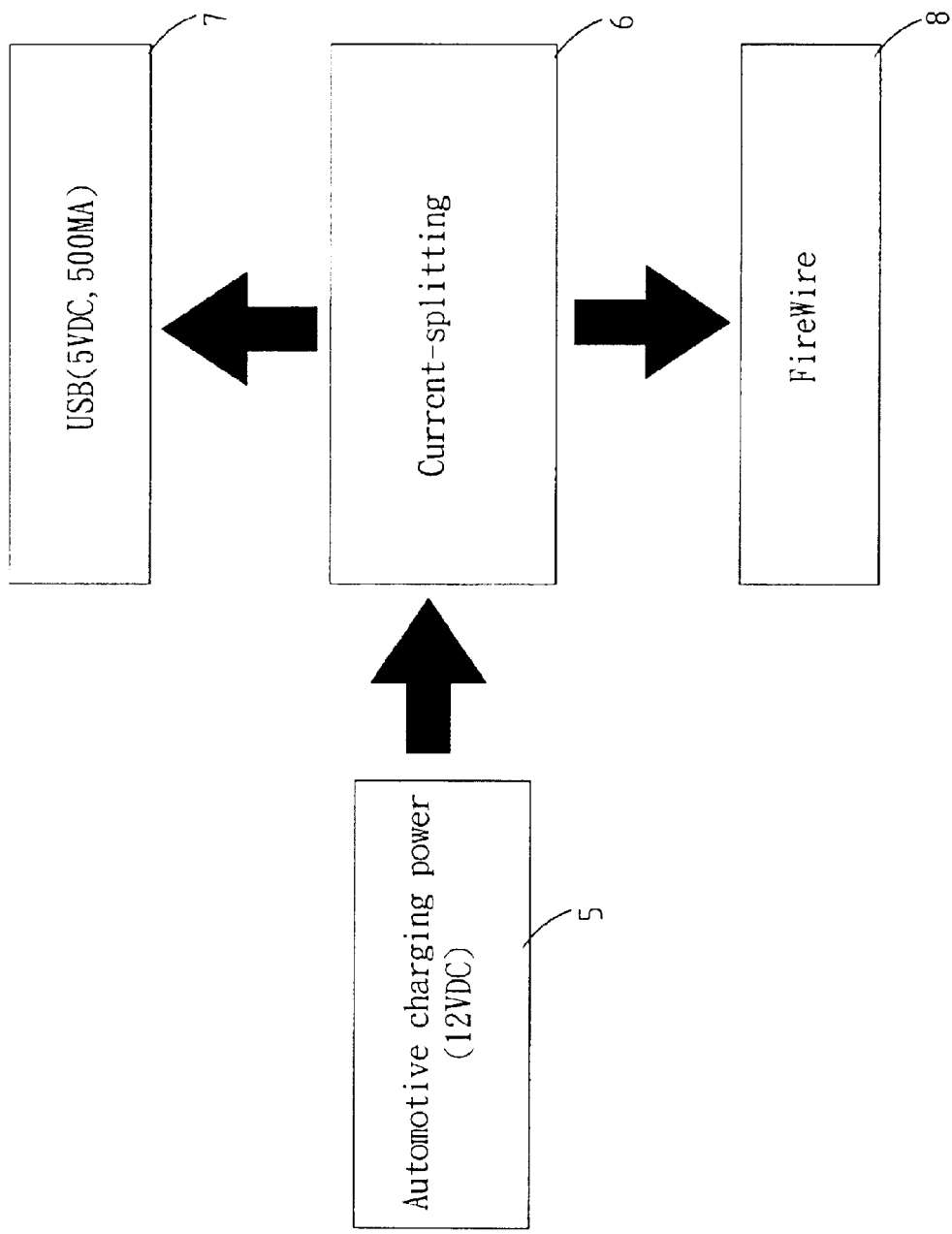
FIG. 2 shows a circuit block diagram according to the FireWire/USB based charger of the present invention.

FIG. 2 shows a circuit block diagram according to the FireWire/USB bus-charger of the present invention. After the protruding plug 125 is plugged into a cigarette-lighting receptacle (not shown) and through the paired conductive wires 120, an automotive 12 VDC charging power 5 is inputted to the circuit board 12, then the current thereof is split and adjusted 6 to offer a 5VDC/500 MA power source 7 to the USB jack 135 as well as another 12VDC power source 8 to the FireWire jack 145 for the iPod.

Figure 3:
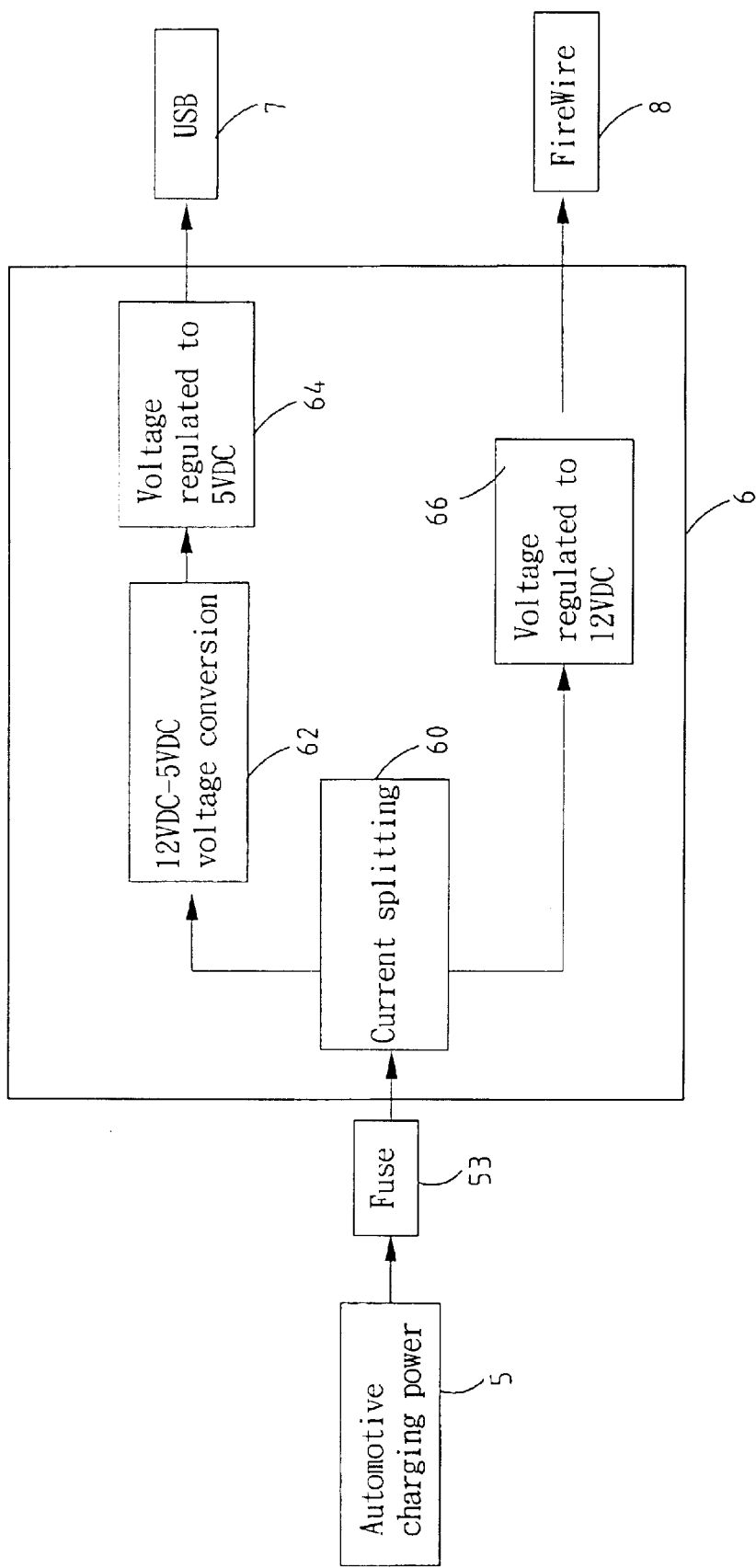
FIG. 3 shows the circuit block diagram of a current-shunting structure according to the FireWire/USB based charger of the present invention.

FIG. 3 shows the circuit block diagram of a current-shunting structure according to the FireWire/USB bus-charger of the present invention. The vehicle's 12 VDC charging power 5 is introduced to the circuit board 12 through an interpolated fuse unit 53 (a tube fuse in this case), where a current-splitting unit 60 is electrically connected with the fuse unit 53. After being treated in the current-splitting unit 60, one part of the 12VDC power is outputted to an electrically connected 5VDC-converting unit 62 for converting 12VDC into 5VDC (by a voltage divider, for example), which is then stabilized in a 5VDC-regulating unit 64 and outputted to the USB jack 135 as a stabilized 5VDC/500 MA USB power source 7.

On the other hand, another part of the 12 VDC power split at the current-splitting unit 60 is outputted to an electrically connected 12VDC-regulating unit 66 for stabilization, then outputted to the FireWire jack 145 as a stabilized 12 VDC FireWire power source 8 for the iPod.

To this point, it is apparent that the present invention is capable to provide two simultaneous bus-charging/bus-power ports, one for USB and the other for FireWire (IEEE 1394). The electrical output would comply with that of the USB and FireWire standard by means of circuitries, providing a safe and convenient method of charging and powering USB and FireWire devices.

In the above described, at least one preferred embodiment has been described in detail with reference to the drawings annexed, and it is apparent that numerous changes or modifications may be made without departing from the true spirit and scope thereof, as set forth in the claims below.

What is claimed is:

1. A FireWire/USB based charger comprising:

a plug seat comprising a casing inside which a shunting/regulating circuit board is fixed, the circuit board further comprising:
   a pair of cigarette-lighting receptacle connecting wires, having a cigarette-lighting plug at one end for plugging into an on-vehicle cigarette-lighting receptacle of an automotive; and the other end connected with the circuit board for input of current from electrical system of the automotive,
   a USB bus cable comprising a first end forming a USB jack for selective connection with a first electronic device having a USB interface and a second end for connection with the circuit board to convert the input power and supplying the converted power to the USB interface, and
   a FireWire bus cable comprising a third end forming a FireWire jack for selectively receiving a second electronic device having a FireWire interface and a fourth end for connection with the circuit board to convert the input power and supplying the converted power to the FireWire interface; and
the casing forming three receptacles for sleeve-jointing with the plug, USB jack, and FireWire jack respectively.

2. The charger according to claim 1, wherein the circuit board is fixed inside the casing by way of plug-disposition or slide-disposition or screw-disposition.

3. The charger according to claim 1, wherein a tube fuse is connected between the paired conductive wires in series for over-current protection.

4. The charger according to claim 3, wherein the shunting/regulating circuit comprises:
   a current-shunting unit electrically connected with a fuse unit, the fuse unit comprising a tube fuse for introducing the vehicle power through a receptacle of on-vehicle cigarette lighter and shunting current;
   a voltage-converting unit electrically connected with the current-shunting unit for converting 12VDC into 5 VDC and outputting the same;
   a 5VDC-regulating unit electrically connected with the voltage-converting unit for regulating 5VDC and outputting the same to said USB jack; and
   a 12VDC-regulating unit electrically connected with the current-shunting unit for regulating 12VDC and outputting the same to said FireWire jack.

5. The charger according to claim 4, wherein the voltage-converting unit comprises a voltage divider.

* * * * *